United States Patent
Marks et al.

(10) Patent No.: US 8,941,726 B2
(45) Date of Patent: Jan. 27, 2015

(54) METHOD AND SYSTEM FOR SEGMENTING MOVING OBJECTS FROM IMAGES USING FOREGROUND EXTRACTION

(75) Inventors: Tim K. Marks, Newton, MA (US); Ashok Veeraraghavan, Cambridge, MA (US); Yuichi Taguchi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 438 days.

(21) Appl. No.: 12/634,839

(22) Filed: Dec. 10, 2009

(65) Prior Publication Data

US 2011/0141251 A1 Jun. 16, 2011

(51) Int. Cl.
*H04N 7/18* (2006.01)
*G06T 7/00* (2006.01)
*G06T 1/00* (2006.01)

(52) U.S. Cl.
CPC ............ *G06T 7/0081* (2013.01); *G06T 1/0014* (2013.01); *G06T 7/0087* (2013.01); *G06T 2207/30164* (2013.01)
USPC ............ 348/61; 382/173; 382/254; 382/152; 700/114

(58) Field of Classification Search
None
See application file for complete search history.

(56) References Cited

U.S. PATENT DOCUMENTS

| | | | | |
|---|---|---|---|---|
| 4,305,130 A * | 12/1981 | Kelley et al. | | 700/259 |
| 4,611,292 A * | 9/1986 | Ninomiya et al. | | 702/153 |
| 4,727,471 A * | 2/1988 | Driels et al. | | 700/66 |
| 5,608,818 A * | 3/1997 | Chini et al. | | 382/153 |
| 5,911,767 A * | 6/1999 | Garibotto et al. | | 701/28 |
| 5,915,048 A * | 6/1999 | Hill et al. | | 382/255 |
| 5,960,125 A * | 9/1999 | Michael et al. | | 382/294 |
| 6,222,938 B1 * | 4/2001 | Melen | | 382/154 |
| 6,252,974 B1 * | 6/2001 | Martens et al. | | 382/107 |
| 6,320,624 B1 * | 11/2001 | Ayer et al. | | 348/584 |
| 6,377,269 B1 * | 4/2002 | Kay et al. | | 345/589 |
| 6,728,582 B1 * | 4/2004 | Wallack | | 700/64 |
| 7,024,054 B2 * | 4/2006 | Cahill et al. | | 382/294 |
| 7,084,900 B1 * | 8/2006 | Watanabe et al. | | 348/94 |
| 7,177,459 B1 * | 2/2007 | Watanabe et al. | | 382/151 |
| 7,302,096 B2 * | 11/2007 | Kim | | 382/173 |
| 7,336,814 B2 * | 2/2008 | Boca et al. | | 382/141 |
| 7,454,053 B2 * | 11/2008 | Bryll et al. | | 382/152 |

(Continued)

FOREIGN PATENT DOCUMENTS

| | | |
|---|---|---|
| JP | 06-018539 | 1/1994 |
| JP | 08-044874 | 2/1996 |
| WO | 2008080606 A1 | 7/2008 |

OTHER PUBLICATIONS

Silvia Anton, Theodor Borangiu, Florin Daniel Anton ,, Recognizing Articulated Objects in Robotic Tasks , Control Engineering and Applied Informatics , CEAI, vol. 9, No. 2, pp. 42-47, 2007.*

(Continued)

*Primary Examiner* — Greg C Bengzon
(74) *Attorney, Agent, or Firm* — Dirk Brinkman; Gene Vinokur

(57) ABSTRACT

A set of images is acquired of a scene by a camera. The scene includes a moving object, and a relative difference of a motion of the camera and a motion of the object is substantially zero. Statistical properties of pixels in the images are determined, and a statistical method is applied to the statistical properties to identify pixels corresponding to the object.

25 Claims, 5 Drawing Sheets

(56) References Cited

U.S. PATENT DOCUMENTS

| | | | |
|---|---|---|---|
| 7,664,315 B2* | 2/2010 | Woodfill et al. | 382/154 |
| 7,978,925 B1* | 7/2011 | Souchard | 382/254 |
| 8,073,197 B2* | 12/2011 | Xu et al. | 382/103 |
| 8,095,237 B2* | 1/2012 | Habibi et al. | 700/245 |
| 8,244,402 B2* | 8/2012 | Wells et al. | 700/250 |
| 8,456,527 B2* | 6/2013 | Elangovan et al. | 348/157 |
| 2005/0244049 A1* | 11/2005 | Onishi et al. | 382/141 |
| 2006/0245635 A1* | 11/2006 | Ishikawa | 382/149 |
| 2007/0047834 A1* | 3/2007 | Connell | 382/274 |
| 2008/0069444 A1* | 3/2008 | Wilensky | 382/173 |
| 2009/0016636 A1* | 1/2009 | Kasashima et al. | 382/274 |
| 2009/0167928 A1* | 7/2009 | Asukabe et al. | 348/345 |
| 2010/0085486 A1* | 4/2010 | Chen et al. | 348/607 |
| 2010/0097476 A1* | 4/2010 | Marks | 348/169 |
| 2010/0302365 A1* | 12/2010 | Finocchio et al. | 348/142 |
| 2010/0303340 A1* | 12/2010 | Abraham et al. | 382/154 |
| 2011/0087360 A1* | 4/2011 | Chen et al. | 700/114 |
| 2011/0091065 A1* | 4/2011 | Chandrashekar et al. | 382/100 |
| 2011/0255775 A1* | 10/2011 | McNamer et al. | 382/154 |
| 2011/0292205 A1* | 12/2011 | Yuguchi et al. | 348/142 |
| 2012/0069198 A1* | 3/2012 | Steinberg et al. | 348/207.1 |

OTHER PUBLICATIONS

Sai K. Vuppala, Sorin M. Grigorescu, Danijela Ristic, and Axel Graser, Robust Color Object Recognition for a Service Robotic Task in the System FRIEND II,Proceedings of the 2007 IEEE 10th International Conference on Rehabilitation Robotics, Jun. 12-15, Noordwijk, The Netherlands.*

Toru Kaneko, "Seeking Applications of Image Processing Technologies." vol. 33, No. 44. ME2009-178 (Oct. 2009) p. 11-16.

* cited by examiner

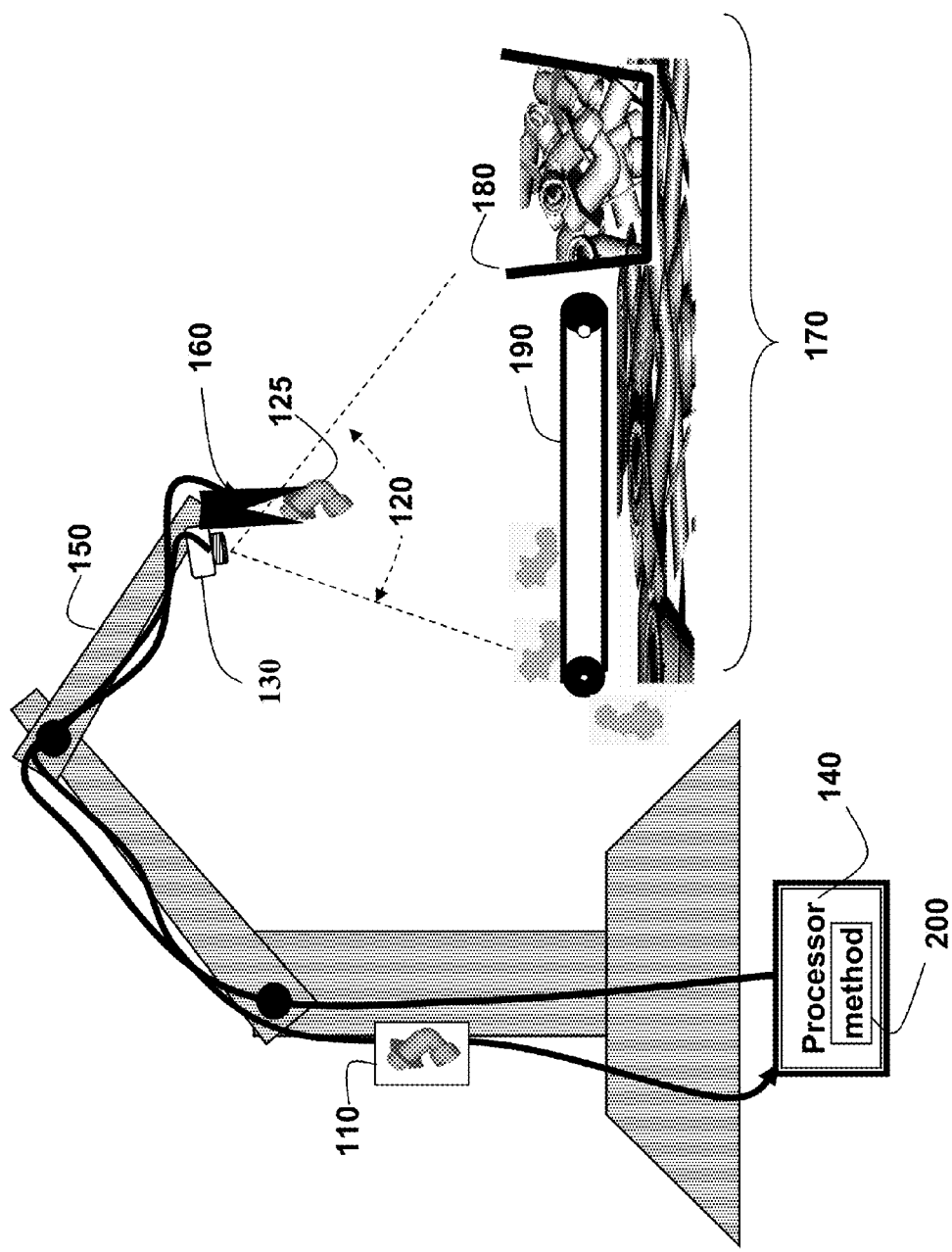

METHOD AND SYSTEM FOR SEGMENTING MOVING OBJECTS FROM IMAGES USING FOREGROUND EXTRACTION

FIELD OF THE INVENTION

This invention relates generally to computer vision, and more particularly to segmenting objects from images, and more particularly to segmenting moving objects using foreground extraction.

BACKGROUND OF THE INVENTION

Segmenting an image of a scene into foreground and background parts is a fundamental task in many computer vision applications. Typically, the foreground part corresponds to an object in the scene. After the object has been segmented from the background, it is easier to perform subsequent tasks on the object, such as object recognition, composition, pose estimation, and positioning.

Background Subtraction

If the background is stationary or slowly varying, then the background can be estimated by applying a low pass filter, such as a mean or median filter, over an image sequence. A Gaussian mixture model (GMM) can also be used to model intensities of pixels associated with the background. After this is done, background subtraction can be accomplished by detecting the pixels that do not conform to the model of the background. Known color-, shape-, or motion-based prior probabilities for the foreground can improve the background subtraction.

Background subtraction can work well in some environments, such as surveillance applications, in which the majority of the pixels are associated with a static background, while a small number of pixels are associated with foreground objects that are moving. In scenarios where the camera is moving, e.g., a camera mounted on a robotic arm, the background pixels also change in intensity due to camera motion, and therefore conventional background subtraction cannot be used.

Intensity-Based Segmentation

Pixel intensities define appearance properties, such as color and texture, in the image. If the statistical properties of the foreground and background are sufficiently different, then an affinity model and a graph-based method can be used to segment the foreground from the background. Most graph-based methods define a graph in which vertices represent pixels, and the vertices are connected by edges. The affinity, or weight, of each edge depends on the locations and intensities of the two pixels that the edge connects. In general, adjacent pixels have a larger affinity, as do pixels with the same intensity properties. The spatial dependence is typically enforced using a Gaussian function on the Euclidean distance between the corresponding pixel locations. Similarly, color- and texture-based dependence is enforced by using a Gaussian or similar weighting function over the difference in color or texture between the corresponding pixels. These and other costs are multiplied to compute an edge weight for each of the edges in the graph. A cost function can be used to find a "cut" on the graph to separate foreground and background pixels. The cost can be normalized to avoid small segments. This leads to a formulation called normalized cuts. Intensity-based segmentation does not work well on images that have a homogeneous appearance.

Model-Based Segmentation

In model-based segmentation, the appearance properties of the foreground are known a priori. This type of segmentation is frequently used for common objects, such as vehicles and people. Model-based approaches depend on the availability of an accurate model of the object(s) to be segmented from the background. These prior models of the foreground objects can be manually prepared, or determined by machine learning that identifies features that distinguish the objects from the rest of the image.

In general, prior art segmentation methods do not work well with dynamic scenes, homogenous scenes, or images acquired by a moving camera.

SUMMARY OF THE INVENTION

The embodiments of the invention provide a method and system for segmenting a set of images into foreground and background parts. Note that "foreground" refers to pixels that are associated with a moving object, while "background" refers to pixels that are associated with the remainder of the scene.

In one embodiment, the foreground corresponds to a moving object in the scene, and the images are acquired by a camera having motion that is substantially identical to the motion of the object. For example, the camera and object are coupled to each other, either physically or logically. The segmentation uses statistical inference on properties of the pixels.

The invention is based on the following idea. Because the camera is moving along with the object, in the frame of reference of the camera, the object appears relatively motionless while the rest of the scene moves due to the camera motion. If the camera acquires multiple images during the motion, then the image features, e.g., color or intensity, of foreground pixels are relatively static, while the features of the background pixels change dynamically over time. If the camera moves during the exposure time of a single image, then in the resulting image, foreground pixels appear sharp while background pixels suffer from motion blur. This is in contrast with prior art background subtraction, in which the foreground generally has motion while the background remains static.

Conventional approaches to segmenting foreground pixels from background pixels typically use background subtraction or variations thereof. To use background subtraction, it is assumed that the background is stationary or static while the foreground is moving or dynamic. Since the foreground is moving in the camera's frame of reference, further processing such as registration is typically necessary even after the background has been subtracted.

In contrast, the invention uses foreground extraction. In our method, the background is assumed to be dynamic or moving with respect to the camera, and the foreground is static or stationary with respect to the camera. As a result, the extracted foreground can be directly used for higher-level computer vision tasks without the need for further low-level processing such as registration.

Because the object is stationary with respect to the camera, the features obtained from the object are not affected by motion of the object and the camera, making the features more reliable, more distinct, and more useful for further computer vision tasks such as pose estimation and object recognition.

It is assumed that the object to be segmented from the background is moving with some velocity (speed and direction), which can vary over time. In order to move the camera with the same velocity as the object, the camera can be physically or logically connected to the object, or the motion of the object can be measured.

The invention can be used in industrial applications where objects are moved by robot arms, by assembly line conveyor systems, or by other mechanical means such as dollies or tracks.

The invention enables the correct positioning of the object as the object is manipulated by automated equipment. For example, if the object is a vehicle part to be painted or drilled, the invention can be used in dynamically orienting the object or the tool for the current processing step. Similarly, the part can be positioned for a next processing step, such as assembly with other parts.

BRIEF DESCRIPTION OF THE FIGURES

FIG. 1A is a schematic of a system and method for segmenting an image according to embodiments of the invention;

DETAILED DESCRIPTION OF THE PREFERRED EMBODIMENTS

Figure 1B:
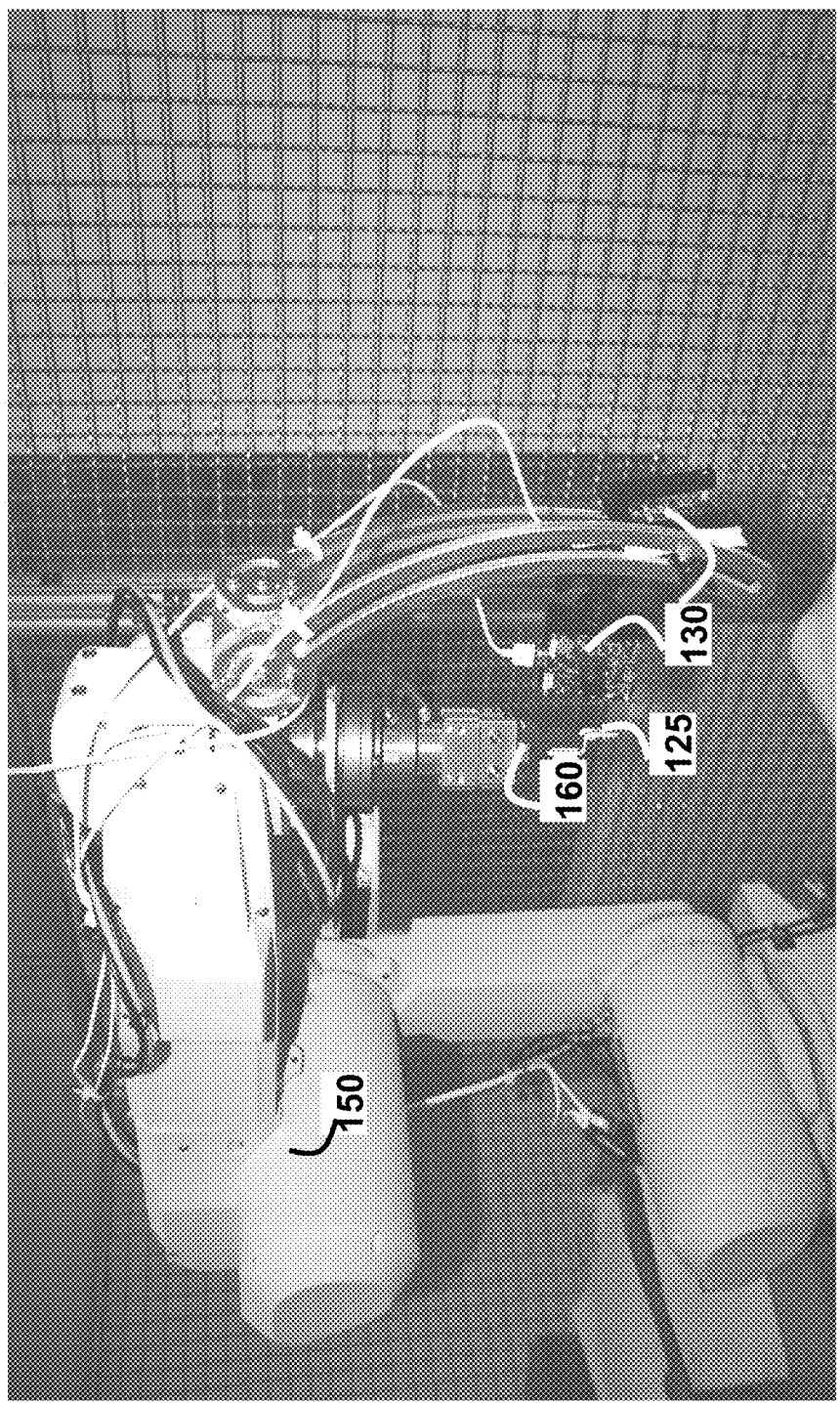
FIG. 1B is a photograph of a robot arm and camera as shown in FIG. 1A.

FIGS. 1A-1B show a system 100 and method 200 for segmenting a set of images 110 acquired of a scene 120. As defined herein, the set of images can include one or more images, where a temporal sequence of images is equivalent to a video. It is understood that the invention can operate on a single image.

The scene includes an object 125. The system also includes a camera 130 having an output connected to a processor 140. The processor includes input/output interfaces and memories as known in the art. The processor performs steps of a method 200 according to embodiments of the invention.

In an example industrial application, the robot picks parts from a bin 180 or from a moving conveyor belt 190. In one embodiment, the camera is arranged on a robot arm 150. The robot arm includes end effector 160 for holding the object. Foreground extraction is performed on the object that is held by the end effector. We are interested in determining the pose of the object that is held by the end effector, after the object has been picked up, so that the object can be positioned into the correct pose for the current or next stage of the industrial process.

The movement of the object is directly coupled to the motion of the camera. The robot arm is moved such that a relative difference between a motion of the object and a motion of the camera is substantially zero. The motion of the object can be known or unknown. It should be noted that the camera could be mounted on any part of the robot arm, as long as the relative motion between the camera and the object is substantially zero. It should also be noted that the invention can work for a single image when there is camera motion during the exposure time of the image.

In another embodiment, the camera is mounted on a first robotic arm, the object is held by an end effector mounted on a second robotic arm, and the arms move in parallel and in unison. In this case, the motion of the object is typically known or measured, and foreground extraction is performed on the object that is held by the end effector.

Alternatively, foreground extraction can be performed on an object that is arranged on the moving conveyor belt. In this case, we are interested in estimating a pose of the object on the conveyor belt. As defined herein, the 6D-pose is a combination of the translational (x, y, z) location and angular ($\theta$, $\phi$, $\psi$) orientation of the object.

After the pose of the object is determined, the pose can be used for the current or next stage in the industrial process, which can involve picking up the object, positioning the object, or using a tool on the object, such as a spray gun, arc welder, drill, or grinder. The camera can be mounted on the robot arm, on the conveyor belt, or elsewhere, as long as the relative motion between the camera and the object is substantially zero.

There are numerous ways to ensure that the difference in relative motion is substantially zero. The motion of the camera and object can be directly coupled, the motion of the object can be known, or the motion of the object can be unknown but measured or estimated. It is understood that multiple cameras can also be used. The background 170 in the scene can be cluttered.

Figure 1C:
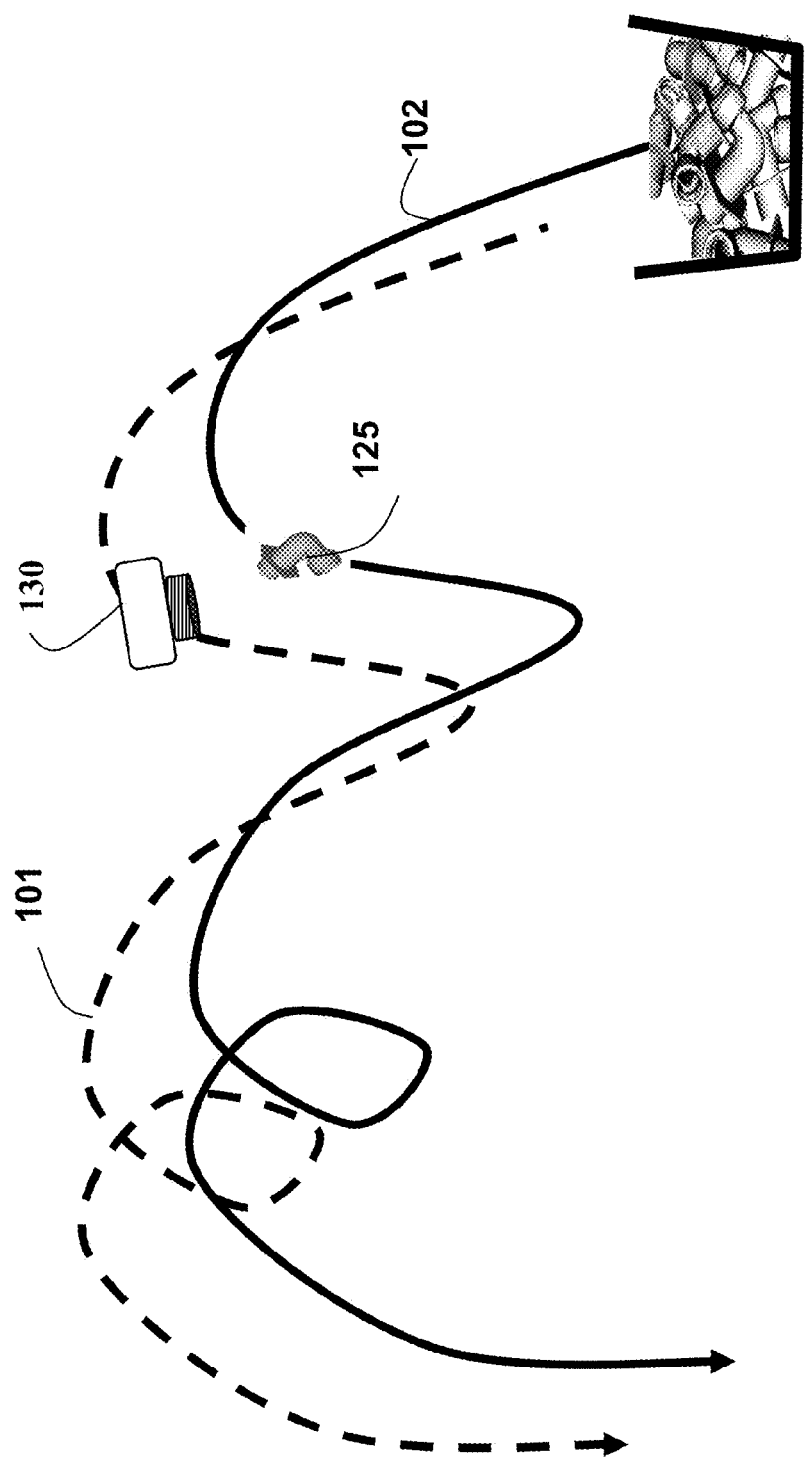
FIG. 1C is a schematic of camera and object motions.

As shown in FIG. 1C, the motion 101 of the camera and the motion 102 of the object can be complex. After the object has been segmented, computer vision tasks such as object recognition and pose estimation can be performed on the segmented object.

Figure 2A:
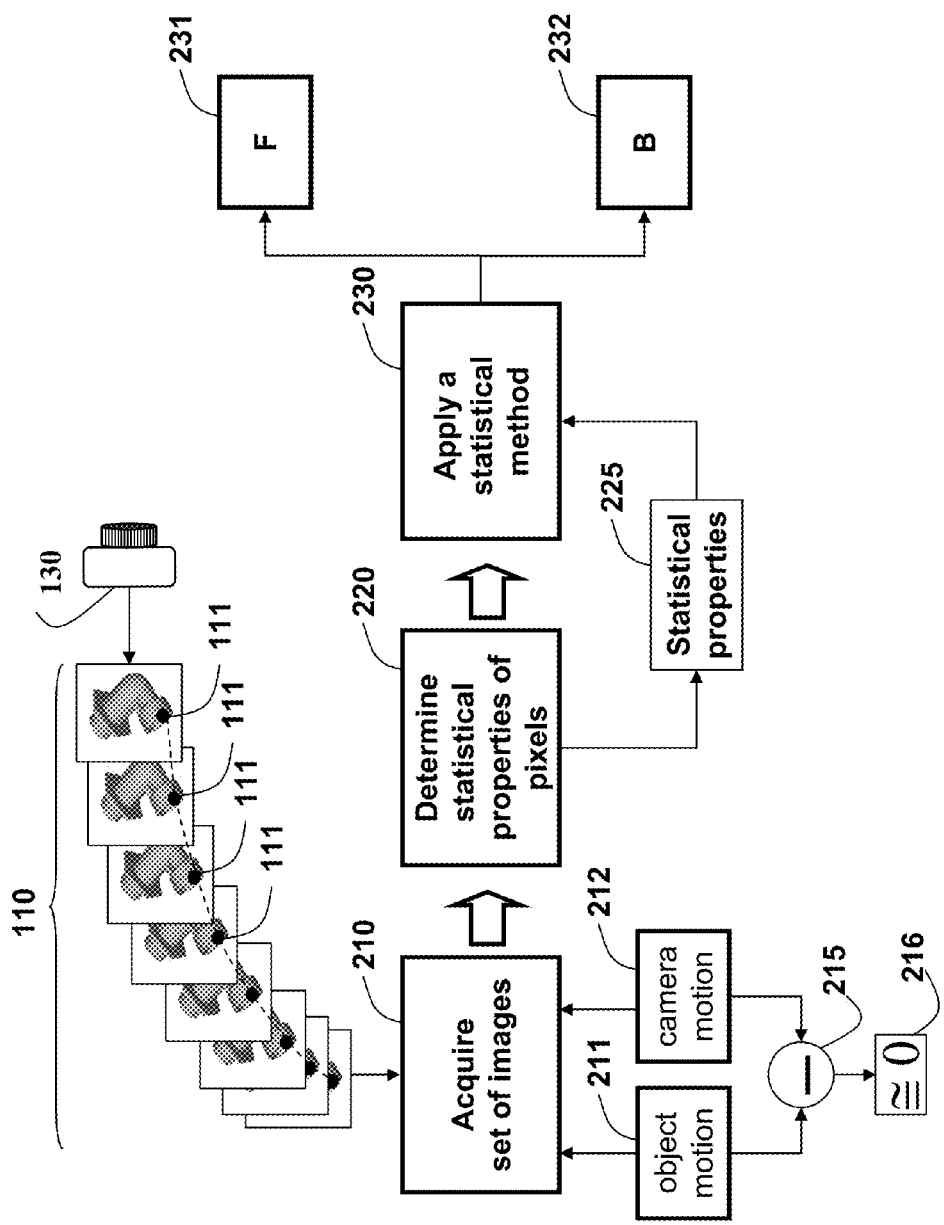
FIG. 2A is a flow diagram of a segmentation method according to embodiments of the invention.

FIG. 2A shows the steps of the method 200. A set of images 110 of the scene including one or more objects of interest is acquired by the camera 130. A relative difference 215 between a motion 211 of the object and a motion 212 of the camera is substantially zero 216. In other words, the velocities and directions of the motion of the object and the motion of the camera are substantially the same, although the motions can be displaced from each other. The acquired set of images is used to determine 220 statistical properties 225 of the pixels. A statistical method is applied 230 to the statistical properties 225 to extract the pixels F 231 that are associated with the object or foreground. The remaining pixels B 232 are associated with the background. It should be noted that the statistical method can be implemented as hardware using, for example, a micro circuit.

Figure 2C:
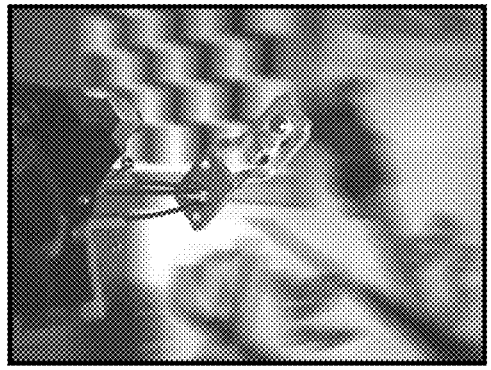
FIGS. 2B-2C are images of a scene acquired respectively without and with camera motion during an exposure time of a single image.

When the camera and object move during an exposure time of one image, as shown in FIG. 2C, pixels corresponding to the foreground object appear sharp, while background pixels are subject to motion blur. The spatial properties of pixels differ between the foreground and background pixels. The foreground pixels tend to exhibit higher spatial gradients and a higher spatial frequency. Therefore, the pixels corresponding to the foreground can be extracted from the image based on this difference of the statistics of the spatial properties. In FIG. 2E, for example, a Canny edge filter was applied to the image in FIG. 2C. Because only the foreground object was stationary with respect to the camera, only pixels associated with the foreground are extracted by the filter.

Figure 2B:
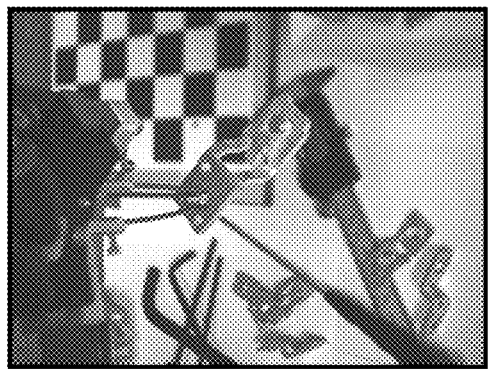
Figure 2E:
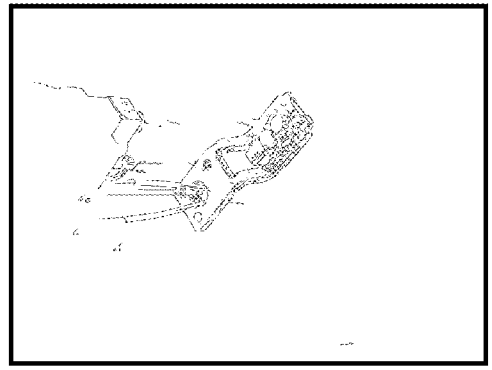
FIGS. 2D-2E are edge images corresponding to the images in FIGS. 2B-2C.
Figure 2D:
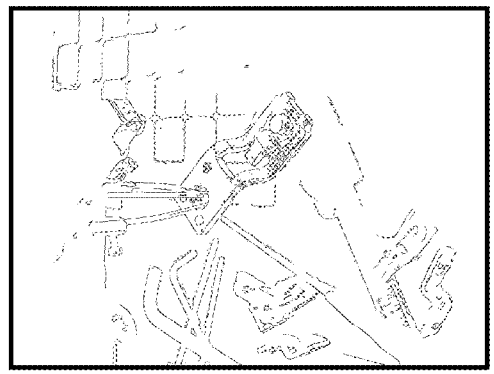

FIG. 2B shows an image acquired without motion. In this image, the entire scene, including both the foreground and background, appears sharp, which makes it difficult to segment the foreground from the background based on the spatial properties of pixels. FIG. 2D shows the edge image obtained by applying the Canny edge filter with the same parameters as used for FIG. 2E. In this case, the filter is unable to distinguish between pixels associated with the foreground and the background.

In the case that the set of images only includes a single image, the embodiments of the invention assume that there is motion of the background with respect to the camera during the exposure time of the image so that the foreground object can be extracted from blurred background.

When the set of images includes a temporal sequence of images, the motion assumption for a single image can be relaxed. In fact, there does not need to be any apparent motion in a single image. In this case, the assumption is that there is apparent motion in the background across the sequence, and the observed motion across the set of images at different times can be used for our foreground extraction, because the foreground appears static across all the images, while the background changes dynamically from one image to the next.

In this case, instead of using spatial statistical properties of each pixel in an individual image, the method uses statistical properties of each pixel (x, y) 111 across the set of images, as the properties dynamically vary over time.

Let I(x, y, i) represent the intensity of a pixel (x, y) 111 in the $i^{th}$ image of the set of images. If multiple RGB channels are used, then the intensities represent color. We use I(x, y, •) to refer to the intensities of the pixel at location (x, y) 111 in the set of images. Similarly, let g(x, y, i) represent a feature or combination of features of pixel (x, y) in image i, and let g(x, y, •) refer to the feature values of pixel (x, y) 111 across all images in the set 110. Examples of such features can include, but are not limited to, any combination of intensity, spatial or temporal gradient of intensity, and spatial, temporal, or spatio-temporal frequency of intensity.

S is a set of all of the pixels in the set of images. It is desired to partition the set S into a set F 231 of the "foreground" pixels and a set B 232 of the "background" pixels.

These sets are related as follows:

S=F∪B, wherein ∪ is a union operator;
F∩B={ }, wherein ∩ is an intersection operator and { } is a null set; and
If the pixel (x, y) is in the set F, then g(x, y, i)≅g(x, y, j) for all pairs of images {i, j} in the set of images.

For each pixel associated with the object, one can consider the features at that pixel across the images in the set as being samples drawn from a distribution $p_f$ whose statistical properties 225 are known, estimated, or modeled. For pixels associated with the background, it can be the case that no simple model can be derived because background pixels correspond to parts of the scene that move with respect to the camera.

In many cases, where it is difficult or impossible to obtain a specific background model, the potentially arbitrary variation of features across the set of images for pixels associated with the background is much greater than the variation of the same features for the foreground pixels. Therefore, we apply the statistical method to this statistical difference between the distribution of features of pixels across the images in the set.

For example, the set of foreground pixels F 231 can be identified according to the statistical properties by considering the statistics of each pixel and performing the following hypothesis test H independently for each pixel:

Null Hypothesis $H_0$: The features g(x, y, •) are drawn from a foreground distribution $p_f$(x, y).

Alternative Hypothesis $H_1$: The features g(x, y, •) are not drawn from the foreground distribution $p_f$(x, y).

The hypothesis test is solved by using a threshold T on a likelihood that the pixel features are drawn from the foreground distribution $p_f$(x, y):

$(x,y)$ is in the set $F$ if $P(g(x,y,•)|F)>T$ and $(x,y)$ is in the set $B$ if $P(g(x,y,•)|F) \le T$, where the threshold T can be determined using a desired false alarm rate (FAR). The FAR refers to a fraction of pixels that are erroneously associated with the foreground.

In a convenient special case, the feature values are defined as the intensities of the pixels, and the foreground distribution $p_f$(x, y) is modeled as a normal (Gaussian) distribution whose variance is constant for all foreground pixels. That is, for each pixel (x, y) in the set F, its intensities I(x, y, •) are drawn from the normal distribution $N(\mu_f(x, y), \sigma_f^2)$, where $\mu_f(x, y)$ is the mean intensity of this distribution, and $\sigma_f^2$ is the variance of intensity, which models small variations in intensity due to factors such as sensor noise and quantization noise. In this case, the hypothesis test can be derived as follows.

The standard deviation s estimated from pixel intensities at a particular pixel (x, y) is $$s(x, y) = \sqrt{\frac{1}{M-1} \sum_i (I(x, y, i) - m(x, y))^2},$$

where M is the number of images used to compute this statistic, and m(x, y) is the estimated mean:

$$m(x, y) = \frac{1}{M} \sum_i I(x, y, i).$$

Then, the partitioning of pixels into sets F and B is performed according to:

$(x,y)$ is in the set $F$ if $s(x,y)<T$; and $(x,y)$ is in set the $B$ if $s(x,y) \ge T$.

It is also possible to do a "soft" segmentation probabilistically, using a Bayesian framework, instead of the binary ("hard") segmentation described above. Another variation of the method partitions the images into smaller parts, and then performs the segmentation on each part independently.

Effect of the Invention

The motion of the object and the camera can be arbitrarily fast and complex, as long as the relative motion between the camera and the object is substantially zero. In addition, the structure and textural properties of the scene and object need not be restricted.

Although the invention has been described with reference to certain preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for extracting pixels from a set of images, comprising a processor for performing steps of the method, comprising the steps of:

acquiring the set of images of a scene with a camera having motion with respect to the scene, wherein the scene includes an object having motion with respect to the scene, wherein the motion of the object and the motion of the camera are substantially identical such that a relative difference of the motion of the camera and the motion of the object is substantially zero, in both translation location and angular orientation, while acquiring the set of images, and wherein the object is stationary with respect to the camera, in both translation location and angular orientation, while acquiring the set of images;

determining statistical properties of pixels in the set of images, wherein the statistical properties measure spatial variations of the pixels, wherein the determining further comprises classifying the pixels by thresholding the spatial variations of the pixels, and wherein the camera is mounted on a robot arm holding the object using an end effector; and applying a statistical method to the statistical properties to identify the pixels corresponding to the object.

2. The method of claim 1, wherein a robot arm is used in a bin picking application.

3. The method of claim 1, wherein the object is held by an end effector that is mounted on a first robot arm, the camera is mounted on a second robot arm, and the camera and object move in parallel.

4. The method of claim 1, wherein the object is arranged on a moving conveyor, and the camera is moved with a velocity of the object.

5. The method of claim 1, wherein the pixels associated with a background of the scene are subject to motion blur while the pixels associated with the object appear static.

6. The method of claim 1, wherein the determining further comprises:
evaluating jointly the spatial variations of the pixels.

7. The method of claim 1, wherein each pixel has an intensity in each image, and wherein the determining further comprises:
applying a Canny edge detector to the intensities in each image.

8. The method of claim 1, wherein the statistical properties are based on a distribution of features at each pixel as the features vary across the set of images.

9. The method of claim 8, wherein the features include combinations of intensity, color, spatial gradient of intensity or color, or spatial frequency.

10. The method of claim 1, wherein S is a set of all the pixels in the set of images, F is a set of foreground pixels, and B is a set of background pixels, and g(x, y, i) represents features of the pixel (x, y) in the $i^{th}$ image such that
S=F∪B, wherein ∪ is a union operator;
F∩B={ }, wherein ∩ is an intersection operator and { } is a null set; and
If the pixel (x, y) is in the set F, then g(x, y, i)≈g(x, y, j) for all pairs of images {i, j} in the set of images.

11. The method of claim 1, wherein the set of images is a temporal sequence.

12. The method of claim 11, wherein the statistical properties measure variations in temporal features of the pixels.

13. The method of claim 12, wherein the temporal features include temporal gradients or temporal frequency of intensity or color.

14. The method of claim 11, wherein the statistical properties measure spatio-temporal features or a combination of spatial features and temporal features.

15. The method of claim 10, wherein the statistical method is a hypothesis test comprising:
a null hypothesis $H_0$ such that the features g(x, y, •) are drawn from a foreground distribution $p_f(x, y)$; and
an alternative hypothesis $H_1$ such that the features g(x, y, •) are not drawn from the foreground distribution $p_f(x, y)$.

16. The method of claim 15, further comprising:
evaluating the hypothesis test by thresholding a likelihood that the features are drawn from the foreground distribution $p_f(x, y)$, and (x,y) is in the set F if $P(g(x,y,•)|F)>T$ and (x,y) is in the set B if $P(g(x,y,•)|F) \leq T$, where T is a threshold.

17. The method of claim 16, wherein the features are intensities I(x, y, •) of each pixel (x, y), the foreground distribution $p_f(x, y)$ is modeled as a normal distribution with a constant variance for all foreground pixels, a standard deviation s estimated from the intensities of a particular pixel (x, y) is $$s(x, y) = \sqrt{\frac{1}{M-1} \sum_i (I(x, y, i) - m(x, y))^2},$$

where M is a number of images used to compute the standard deviation and m(x, y) is a mean:

$$m(x, y) = \frac{1}{M} \sum_i I(x, y, i),$$

and a partitioning of the pixels into the set F and the set B is performed according to:

(x,y) is in the set F if $s(x,y)<T$; and (x,y) is in the set B if $s(x,y) \geq T$.

18. The method of claim 1, wherein the statistical method is Bayesian.

19. The method of claim 1, further comprising:
determining a current pose of the object using the pixels identified with the object.

20. The method of claim 19, further comprising:
positioning the object from the current pose to a desired pose.

21. The method of claim 1, wherein the statistical properties are probabilistic, and wherein the statistical method is used to estimate a confidence of a classification of each pixel as being associated with a foreground or a background.

22. The method of claim 1, wherein the camera and the object move during an exposure time of a single image.

23. A system for extracting pixels from a set of images, comprising:
a camera configured to acquire the set of images of a scene, wherein the camera has motion with respect to the scene, wherein the scene includes an object having motion with respect to the scene, wherein the motion of the object and the motion of the camera are substantially identical such that a relative difference of the motion of the camera and the motion of the object is substantially zero, in both translation location and angular orientation, while acquiring the set of images, and wherein the object is stationary with respect to the camera, in both translation location and angular orientation, while acquiring the set of images;

means for determining statistical properties of pixels in the set of images, wherein the statistical properties measure spatial variations of the pixels, wherein the determining further comprises classifying the pixels by thresholding the spatial variations of the pixels, and wherein the camera is mounted on a robot arm holding the object using an end effector; and means for applying a statistical method to the statistical properties to identify the pixels corresponding to the object.

24. The system of claim 23, further comprising:

a robot arm, wherein the camera is arranged on the robot arm, and wherein the robot arm further comprises:

an end effector for holding the object.

25. The method of claim 1, wherein the spatial variations include spatial gradients or spatial frequency of intensity or color of the pixels.

* * * * *